US007464270B2

(12) United States Patent
Patankar et al.

(10) Patent No.: US 7,464,270 B2
(45) Date of Patent: Dec. 9, 2008

(54) APPLICATION IDENTIFICATION AND LICENSE ENFORCEMENT

(75) Inventors: Vishnu A. Patankar, Kirkland, WA (US); Robert Reichel, Sammamish, WA (US); John J. Lambert, Seattle, WA (US); Kedarnath A. Dubhashi, Redmond, WA (US); Jim E. Thatcher, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 821 days.

(21) Appl. No.: 10/625,312

(22) Filed: Jul. 23, 2003

(65) Prior Publication Data

US 2005/0021971 A1 Jan. 27, 2005

(51) Int. Cl.
G06F 11/30 (2006.01)
G06F 12/14 (2006.01)
H04L 9/32 (2006.01)

(52) U.S. Cl. ............... 713/176; 713/187; 709/220; 709/226

(58) Field of Classification Search ............ 713/187, 713/176
See application file for complete search history.

(56) References Cited

U.S. PATENT DOCUMENTS

| 5,892,904 | A | * | 4/1999 | Atkinson et al. | ............ | 726/22 |
| 6,026,235 | A | * | 2/2000 | Shaughnessy | ............ | 717/127 |
| 6,188,995 | B1 | * | 2/2001 | Garst et al. | ............ | 705/59 |
| 6,405,316 | B1 | * | 6/2002 | Krishnan et al. | ............ | 713/190 |
| 6,629,154 | B1 | * | 9/2003 | Jones et al. | ............ | 719/330 |
| 2005/0005112 | A1 | * | 1/2005 | Someren | ............ | 713/167 |

OTHER PUBLICATIONS

Stevens, A.; "Sun blades awalt cutting edge"; IT Week; vol. 6; No. 8; Mar. 3, 2003; VNU Business Publications; UK.
Faragher, J.; "Cutting edge?"; Infoconomy; Mar. 2002; UK; p. 30-2.
Feng, et al; The Bladed Beowulf: A Cost-Effective Alternative to Traditional Beowulfs; Proceedings of the IEEE International Conference on Cluster Computing (Cluster'02); 0-7695-1745-5/02; pp. 1-10.
Webb; "Bladerunners: serving remote data"; www.edn.com; Sep. 26, 2002; Design Feature.
Williams; "At your Service"; Irish Computer Oct. 14, 2002.
Burt; "New breed of blade servers comes of age"; Week, The Enterprise Newsweekly; Feb. 17, 2003; eweek.com.
Greenemeier; "Blade offers companies a new cutting edge"; Journal Computing; pp. 39-40; Oct. 31, 2002; UK.

* cited by examiner

*Primary Examiner*—Emmanuel L Moise
*Assistant Examiner*—Shewaye Gelagay
(74) *Attorney, Agent, or Firm*—Lee & Hayes, PLLC

(57) ABSTRACT

The restriction of particular resources includes providing a digital signature for unauthorized resources based on a structure-related parameter of the resource. Thus, attempts at circumventing recognition of such resource will likely result in altering the overall functionality of the resource. Further, such digital signatures are encoded in a critical file required for loading of a resource, thus ensuring that the identity of the resource is considered before execution thereof. Enforcement of the resource restriction includes generating a verification signature for a resource that requests loading. The verification signature is compared to the signature coded into the critical file, and a positive match results in the resource being blocked from loading.

25 Claims, 6 Drawing Sheets

APPLICATION IDENTIFICATION AND LICENSE ENFORCEMENT

FIELD

The present invention relates to regulating the use of resources loading on processing devices.

BACKGROUND

The misuse of computer software is costly. For the provider and/or user of unauthorized software, the cost of misusing software can be measured, in part, in terms of legal costs and fines if found to violate any copyrights and/or licensing agreements associated with the misused software. Additional dangers lie in the fact that unauthorized software applications often contain viruses with the potential to damage individual computers or even an entire network. Further still, unlicensed software may cause incompatibility between programs that would normally function together seamlessly. Yet another cost associated with the misuse of computer software is to a developer, server, or provider of licensed software products for whom the cost of misused software can be measured primarily in terms of lost licensing revenue.

Accordingly, developers, servers, and providers of licensed or otherwise authorized software products are highly motivated to regulate the execution of software on authorized operating systems for client devices and server devices. Crucial considerations for succeeding in such endeavor include quickly and accurately identifying and then restricting unauthorized software applications from loading without hindering the concurrent execution of licensed software applications.

Previous attempts at identifying software products for the purpose of restricting those that are not licensed or otherwise authorized include performing a bit-by-bit comparison of the entire code of a file against a known version thereof, comparing the size of a file to previously known parameters, and comparing a predetermined number of bits at the beginning of the file to those of previous versions of the file. However, such efforts are easily thwarted because the binary code associated with unauthorized software products may be changed, even slightly, to avoid detection. For instance, changing a file name or file location can change the appearance and/or size of a file, thus frustrating efforts to regulate the usage thereof. Even minor code fixes, not intended to circumvent file recognition, can render a file unrecognizable relative to known versions. Furthermore, such efforts consume valuable processing resources and/or overhead, which impede the usage of licensed or otherwise authorized software products.

SUMMARY

Application identification and license enforcement are described herein.

According to one aspect, restricting the use of particular resources includes providing a cryptographic signature for a particular resource predicated on a static feature of the resource. Thus, attempts at circumventing recognition of such resource will likely result in altering the overall functionality of the resource. The signatures are encoded in a critical file required for loading and/or running of the resource, thus ensuring that the identity of the resource is verified before the resource is executed. Enforcement of the resource restriction includes generating a verification cryptographic signature for a resource that requests loading. The verification signature is compared to the signature coded into the critical file, and a determination is made as to whether to block the resource from loading and/or running based on whether the comparison results in a positive match.

BRIEF DESCRIPTION OF THE DRAWINGS

The following detailed description, while indicating example embodiments, is only illustrative since various changes and modifications will become apparent to those skilled in the art from the following detailed description, in which.

DETAILED DESCRIPTION

Figure 1:
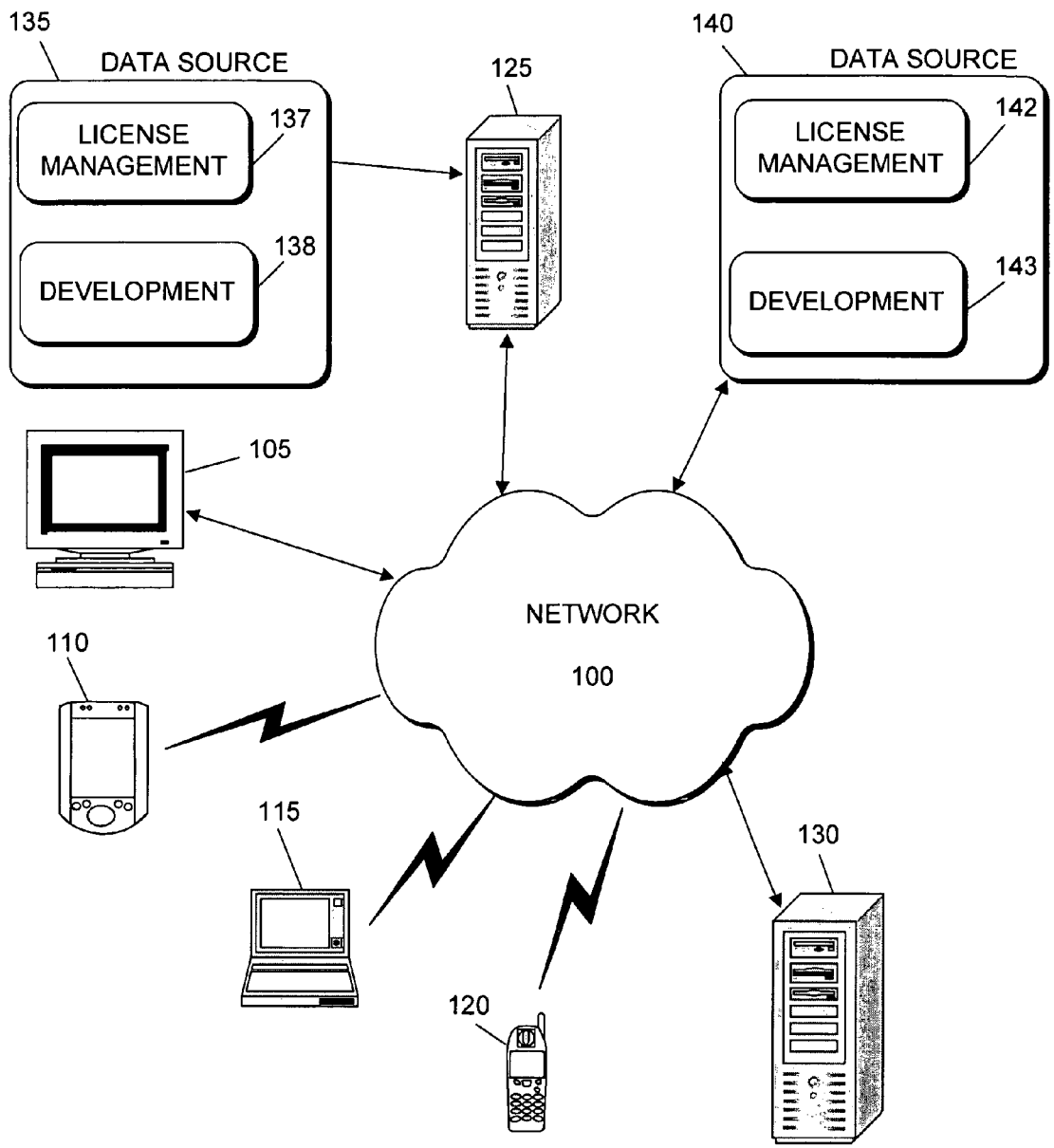
FIG. 1 shows a client/network system in accordance with example embodiments.

In the example network environment of FIG. 1, multiple client computing devices 105, 110, 115, and 120, also referred to as clients, are coupled to server devices 125 and 130 via network 100. Network 100 is intended to represent any of a variety of conventional network topologies and types, which may include wired and/or wireless networks. Network 100 may further utilize any of a variety of conventional network protocols, including public and/or proprietary protocols. Network 100 may include, for example, the Internet as well as possibly at least portions of one or more local area networks (LANs).

Computing device 105 may include any of a variety of conventional computing devices, including a desktop personal computer (PC), workstations, mainframe computers, Internet appliances, and gaming consoles. Further computing devices associated with network 100 may include a personal digital assistant (PDA) 110, a laptop computer 115, and a cellular telephone 120, etc., which may be in communication with network 100 by a wired and/or wireless link. Further still, one or more of computing devices 105, 110, 115, and 120 may include the same types of devices, or alternatively different types of devices.

Server devices 125 and 130 may provide any of a variety of data and/or functionality to computing devices 105, 110, 115, and 120. The data may be publicly available or alternatively restricted (e.g., restricted to only certain users, available only if the appropriate fee is paid, etc.), as will be discussed in greater detail below.

The discussions herein refer to server devices and client devices, with all features described above included in the scope of a corresponding description. A server device may include any device that is the source of content, and a client device may include any device that receives such content (e.g., for presentation to a user at the client device). For example, in a peer-to-peer network, the device that is the source of the content may be referred to as the server device while the device that receives the content may be referred to as the client device.

Server devices 125 and 130 may include at least one of a network server and an application server. A network server is a server device that delivers content to any of client devices 105, 110, 115, and 120 by way of network 100. Such content may include a text file coded in HTML, which may also contain JavaScript code or other commands. Although frequently referred to herein as a "web server", it is to be appreciated that network server device 125 can be used in other networks that are not part of the World Wide Web.

A web server 125 or 130 may provide comprehensive Internet services to client devices 105, 110, 115, and 120. Web server 125 or 130 may incorporate any or all of an HTTP (hypertext transport protocol) server for delivering web pages and files, an FTP server (file transport protocol) for delivering file downloads, an NTTP server (network news transport protocol) for delivering newsgroup files, and an SMTP server (simple mail transfer protocol) for delivering e-mail.

The term "web server" may be used to refer to the combined hardware and operating system of server devices 125 and 130, the operating system organizing and controlling the hardware and other software resources of server devices 125 and 130. Resources including operating systems and other applications or programs may be provided to server devices 125 and 130 by at least one of data source 135, which is off-line, and data source 140, which is on-line. Similarly, the software resources existing on server devices 125 and 130 may similarly be upgraded or replaced using off-line and on-line means and methodologies, which are well known in the art.

Application server 125 or 130, which is typically web-based, is a server device in a client/server environment that performs business logic, provides a user interface, and performs data processing. An application server runs software in an intranet/Internet environment that hosts a variety of language systems used to program database queries and/or general business processing. Application servers may provide organizational support for groupware, directory services, and databases. Groupware includes software for supporting multiple users working on related tasks, often linking non-web-based applications such as those for managing calendars, schedules, contacts, and tasks. Directory services utilize specialized databases, typically hierarchical in design, to manage user accounts and network authorizations. Databases include sets of related files created and managed by a database management system (DBMS).

Web servers and application servers may be separate devices or they may reside in a same server device, often depending on the size and needs of the entity or organization that they service. Further, overlap may exist between a web server and an application server servicing a common entity or organization. For instance, a web server may invoke scripts and services to query databases and perform business processing, and an application server may include an HTTP server to deliver web pages to client devices.

For a variety of reasons, mostly financial, "blade servers" are being made available to provide entities and organizations with a server dedicated solely to web serving and hosting purposes. More particularly, blade servers are intended to provide high performance web-based services, including web page serving and ASP (active server page) execution, at a low entry price. As a restricted-use server device, a blade server is to prevent the loading of applications or programs that lack an appropriate web server license. Non-limiting examples of such restricted applications pertain to groupware, database and directory services.

Example embodiments related to such a restricted-use server device include, both singularly and in combination together: the generation of a unique identifier for a software application or program, the identifier also being referred to as a digital ID, signature, or fingerprint; and the enforcement of an application or program restriction, often the result of the lack of a web server licensing agreement. In particular, embodiments of a restricted-use server device identify a restricted application or program, and further restrict the loading of such a software application or program based on the identification of the application or program. Even more specifically, an embodiment of a license enforcement scheme for a restricted-use server device assigns a unique identification to a restricted application, "bakes" or codes the identification and a restriction/authorization status of the restricted application into an operating system to run on a server device, identifies all applications sought to be loaded on the server device, and appropriately restricts the applications based on a positive comparison between the identification and restriction/authorization status coded into the operating system and the identification made at the server device.

Figure 2:
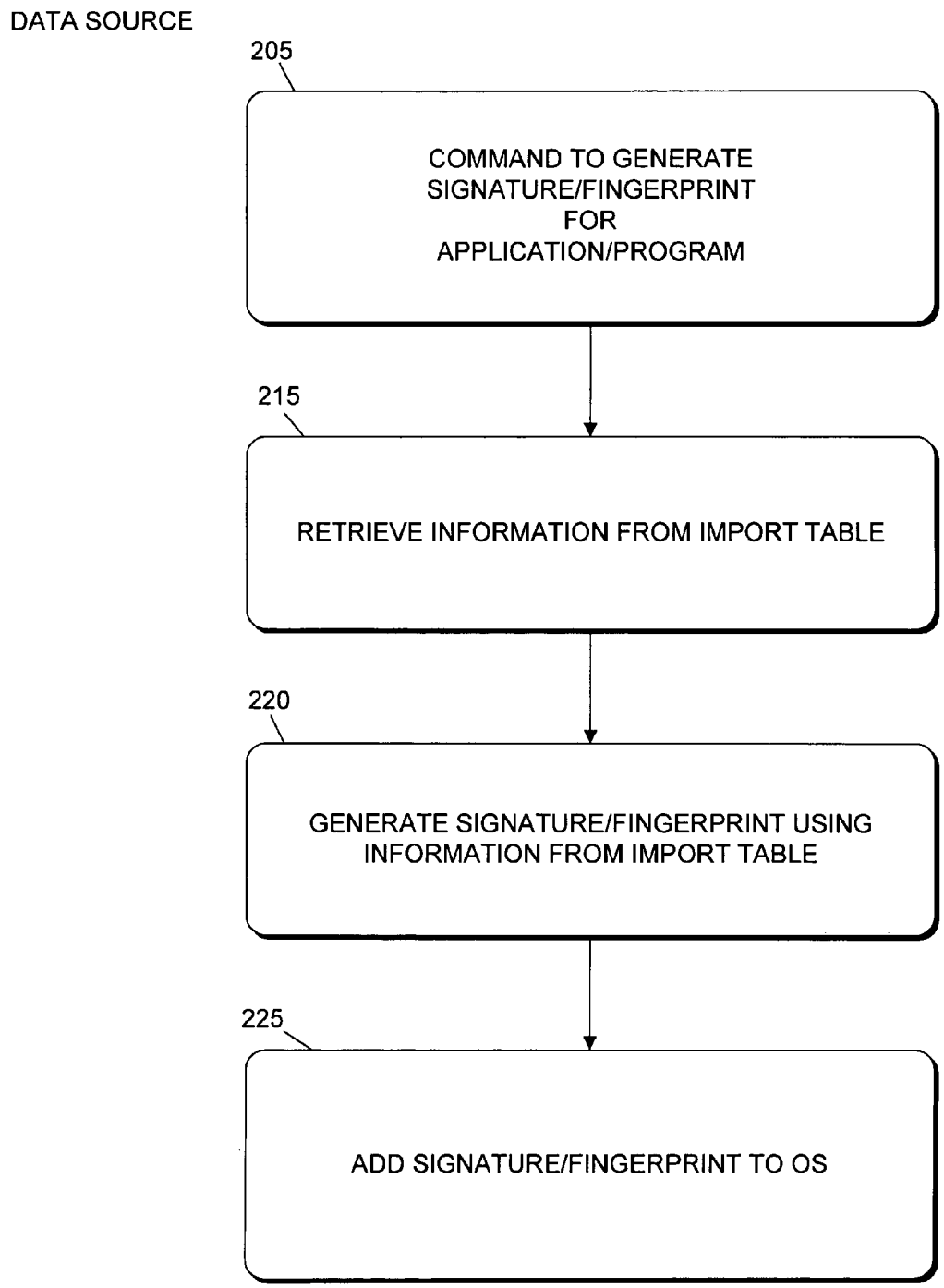
FIG. 2 illustrates the processing for a feature according to an example embodiment.
Figure 3:
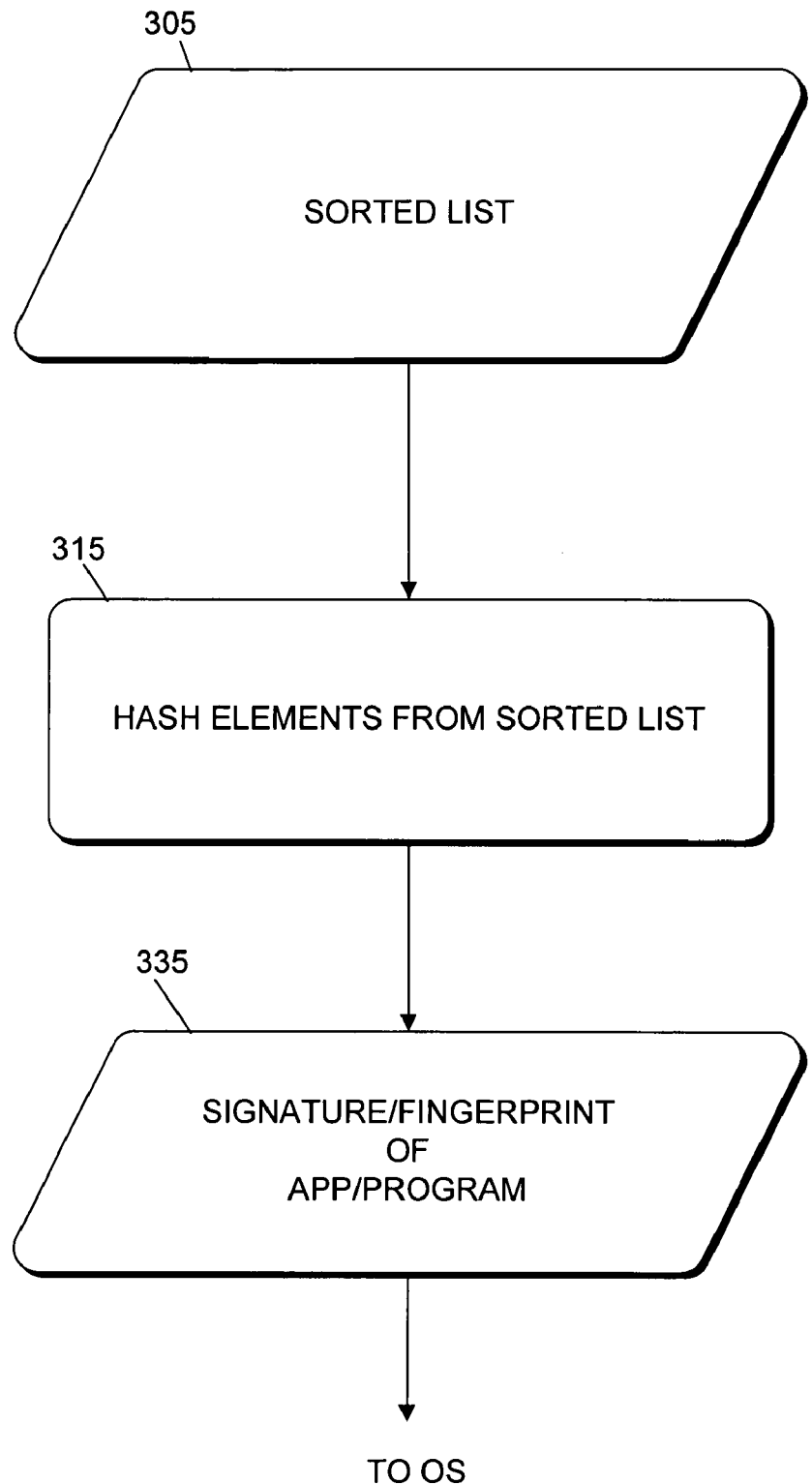
FIG. 3 illustrates an example of processing further to the embodiment of FIG. 2.

The process of FIG. 2 and data flow of FIG. 3 pertain to a data source 135 or 140 (see FIG. 1) that may include, either singularly or in combination thereof, licensing manager component 137 or 142 and software developer component 138 or 143. At data source 135 or 140, a licensing structure is implemented to render particular files, which are software applications or programs to be executed on a server device, eligible or ineligible for execution. Implementation of the licensing structure results in a command 205 to generate a unique identifier for the particular applications or programs in accordance with a corresponding licensing status.

Applications and programs are formatted in an executable code (hereafter "executable") in order to be executed by server device 125 or 130. Executables have an import table, which lists one or more dynamic link libraries (DLL) associated with the executable. A DLL is a module that can be used to perform one or more functions at runtime for the executable. Import tables may also be regarded as a set of data identifying an application or program, or as a linker table describing specific linkages to other applications or programs. For the sake of consistency, the description that follows will make reference to an import table though the corresponding discussion set forth above is to be included in the scope thereof.

According to the example embodiment of FIG. 2, the names of the functions included in each of the DLLs are retrieved 215 from the import table. These retrieved names, which may include the names of the DLLs, are used to generate 220 a unique identification for the application or program. These names can be combined in any of a variety of manners to generate the unique identification.

FIG. 3, which shows a signature generator, illustrates an example of uniquely identifying each application or program, e.g., 220 of FIG. 2. As discussed above, a unique identification for each application or program may alternatively be referred to as a digital signature or fingerprint. For the sake of consistency, the description that follows will reference a signature though the above discussion of the terms identification and fingerprint are to be included in the scope thereof.

In FIG. 3, a sorted list 305 of the retrieved function names is culled from the import table in a case-insensitive manner, based on a predetermined criterion, e.g., alphabetically, by name size in ascending or descending order, etc. The sorted list 305 of function names, which may include the corresponding DLL name, are then concatenated, or strung together consecutively.

The function names from an import table are generally unique, and typically cannot be changed without affecting the very functionality of the corresponding executable. Although major version releases of an application or program may include changes in an import table, import tables typically vary little from one version of an application or program to another, and generally not at all in localized versions of the application or program, i.e., they are static in nature and are considered to be integral to the structure of the application or program. Further, the function names are resistant to minute differences in executables including minor code tweaks to fix bugs, re-ordering binaries, filename changes, and filename location changes. Regardless of an underlying motivation, the aforementioned minute differences have previously succeeded in efforts to circumvent detection and/or recognition of particular applications or programs without changing the functionality thereof. Conversely, any change to a function name affects the functionality of the application or program. More specifically, since the function names are references to functions in an external DLL file, changing a function name means that the corresponding function will not be found in the DLL resulting in a runtime error, and thus the program or application will be inoperable. Therefore function names are presently utilized for generating the signature for an application or program, thus preserving the reliable and robust nature of the example embodiments described herein.

The sorted and concatenated elements 305 of the import table are hashed 315 resulting in a unique signature 320 for the application or program. The hash is a cryptographic manipulation, and according to an example embodiment, includes a one-way MD5 (Message Digest 5) hash function. The result of an MD5 hash is a unique 16-byte signature for the executable of the application or program. Alternative one-way hash functions may be used, including SHA1 (Secure Hash Algorithm 1). The generated signature may be alternatively referred to as a "hash."

As mentioned above, this process is reliable and robust due to the utilization of at least the unique function names from the import table. In particular, sorting the function names from an import table in a predetermined manner and hashing a concatenation or string thereof result in a miniscule rate of collisions, i.e., the chance of identical signatures for multiple executables is very small. Further still, the hashing of only elements from the import table occupies a limited portion of processing resources, thus reducing the associated overhead. For instance, it is not necessary to load the entire binary code to memory for the hash computation. In addition, since only import table elements are hashed, very little of the actual binary code comprising the application or program are utilized in the signature generating effort. Also, considering the small size of an import table relative to the remainder of the application or program, the hash computation may be performed rapidly thereby reducing any hindrance to reliable execution of any authorized applications or programs running concurrently.

Continuing with regards to FIG. 2, data source 135 or 140 adds 225 the generated signature 335 to an operating system to be executed by server device 125 or 130. In view of the critical role an operating system plays for implementing a restricted-use server device, a list of prohibited applications or programs may be coded into a DLL for an operating system, which resides in the server device memory at all times while the server device is running and provides basic services. That is, the hashes are preferably coded into a critical file of the operating system. The kernel is the part of the operating system that is closest to the hardware of the server device and may activate the hardware directly or interface to another software layer that drives the hardware. In a Microsoft® Windows® operating system environment, an appropriate DLL for containing a list of prohibited applications or programs would be the kernel32.dll. Such example is non-limiting. For a restricted-use server device such as a blade server, the hash list includes the signatures for unlicensed applications or programs. However, it is further contemplated that the hash list may include the signatures of licensed applications or programs, or applications or programs that are at least one of ineligible and eligible for execution, with the respective hashes being appropriately categorized according to eligibility or accessibility.

Having been coded to include at least a hash and perhaps a restriction/authorization classification for respective applications or programs, the operating system may be loaded onto a server device 125 or 130. For example, the operating system may be loaded onto server device 125 from off-line data source 135, or onto server device 125 or 130 from on-line data source 140. Further, operating system service packs with updated hashes may be loaded onto the server devices 125 and 130 in a similar manner. Appropriate means and methodologies are well known in the art.

Figure 4:
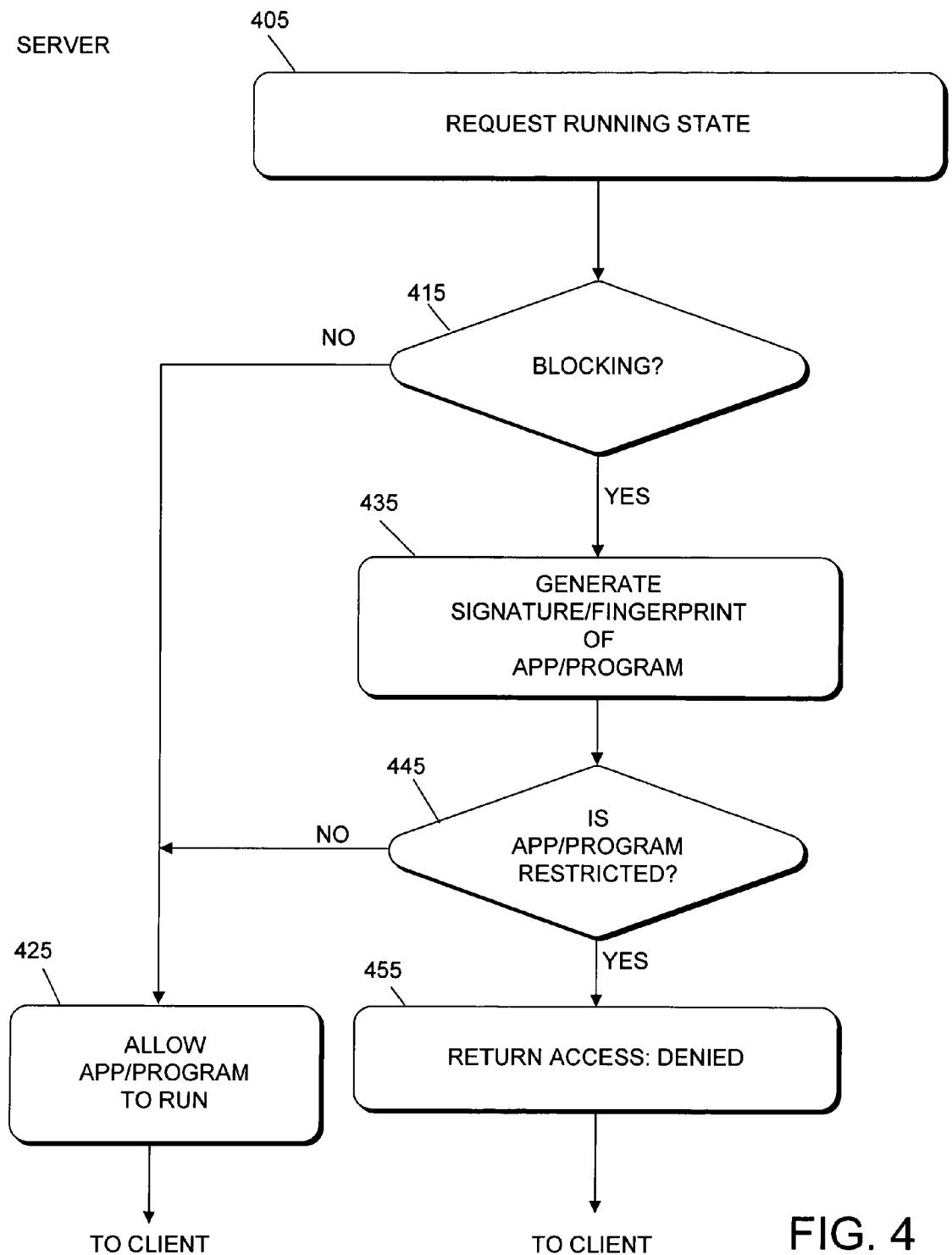
FIG. 4 illustrates the processing according to another example embodiment.
Figure 5:
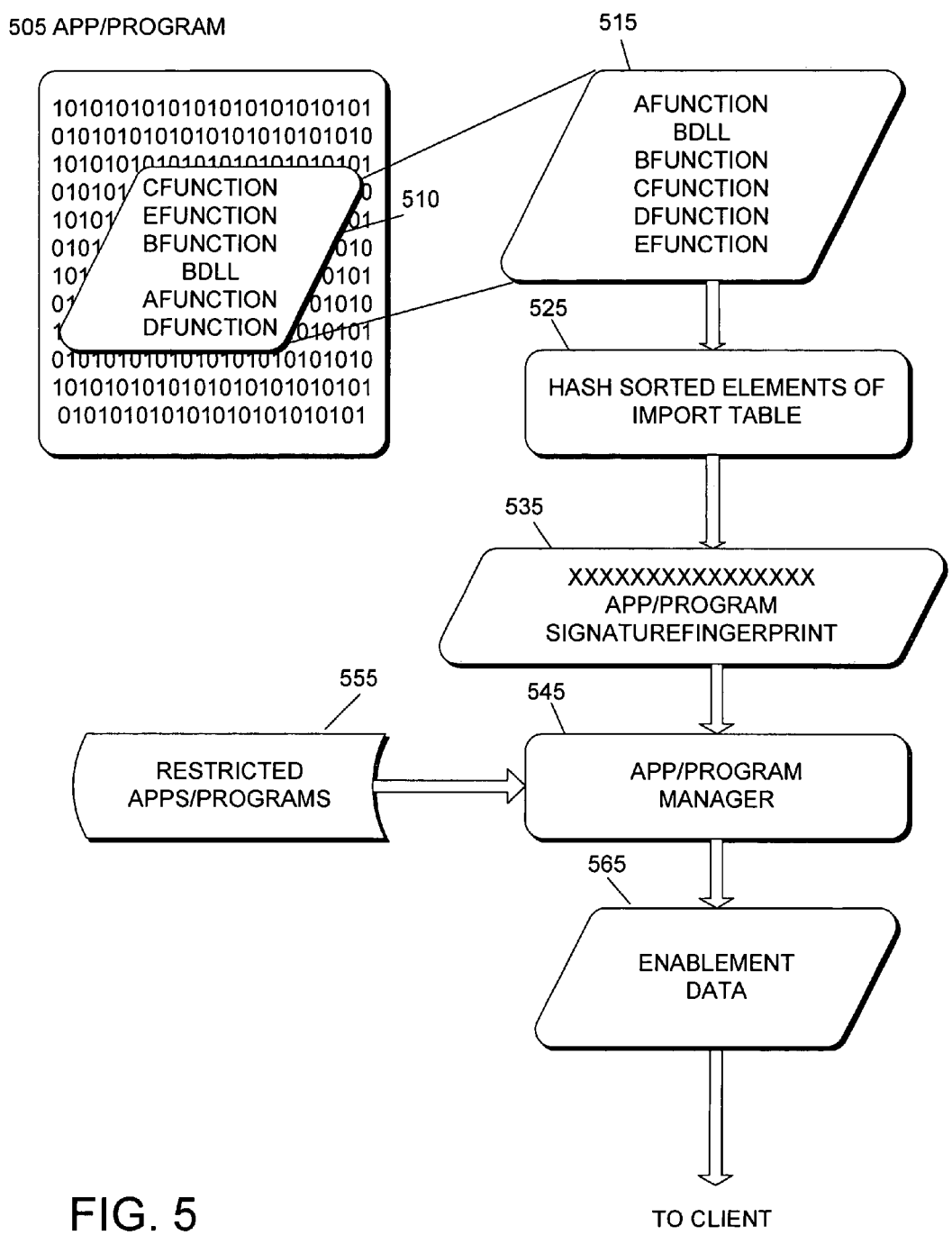
FIG. 5 illustrates an example of processing further to the embodiment of FIG. 4.

FIGS. 4 and 5 are examples of the enforcement implemented by a restricted-use server device in accordance with the application or program identification described above. In particular, the data flow of FIG. 5 may be incorporated within the processing described in reference to FIG. 4 below.

When a startup configuration of server device 125 or 130 or a direct invocation at a local system calls for an application or program to be opened or loaded at restricted-use server device 125 or 130, the application or program on the operating system at server device 125 or 130 requests 405 a running state, i.e., requests execution by the server device. The operating system loads the code of the executable of the application or program through an application programming interface (API). That is, an executable must be processed by an API in order to achieve a running state. An example of an API in a Microsoft® Windows® operating system environment is called CreateProcess. Such example is non-limiting.

When the API receives the request 405 for a running state for an application or program, a determination 415 may be made as to whether particular applications or programs are being blocked at the particular server device 125 or 130, i.e., whether the server device is a restricted-use server device. However, since blade servers may be designed, manufactured, and/or sold as restricted-use server devices, this decision step may be circumvented in favor of the assumption that unlicensed applications or programs are to be blocked from loading, i.e., restricted.

The API of an operating system generates 435 a verification signature of the application or program requesting a running state. Generation 425 of the verification signature for the application or program requesting a running state can be performed following the same procedure described above with respect to FIG. 3, relating to the generation of a signature for an application or program to be coded into an operating system. However, the discussion further below regarding FIG. 5 will provide additional details regarding the generation and processing of the verification signature.

The generated verification signature is compared to the signatures of the applications or programs that are coded into a DLL for an operating system kernel, and thus a determination 445 is made as to whether or not the application or program requesting a running state is restricted. A negative determination allows 425 the respective application or program to be loaded by the operating system at the restricted-use server, though a positive determination denies 455 access to the application or program.

FIG. 5 refers back to the generation 435 of the verification signature of the application or program requesting a running state at the restricted-use server device 125 or 130. When application or program 505 requests a running state, the import table 510 of the executable of the application or program is put 515 in a canonical form, e.g., alphabetically. For example, import table 510 includes hypothetical functions names, which may include the DLL name, as listed in the import table, "CFUNCTION," "EFUNCTION," "BFUNCTION," "BDLL," "AFUNCTION," and "DFUNCTION." The function names are sorted alphabetically as "AFUNCTION," "BDLL," "BFUNCTION," "CFUNCTION," "DFUNCTION," and "EFUNCTION." Alternate criteria by which the function names may be sorted include, for example, name size in ascending or descending order, etc.

The sorted function names 515 are then summed or concatenated, resulting in a single string including all of the function names from the sorted list 515 of import table elements. The sorted elements of the function table, having been strung together, are then hashed 525 using a cryptographic algorithm. A one-way hashing algorithm is utilized to generate a fixed string of numbers from a string of function names, which may include the DLL name. Example embodiments include hashing the import table elements using an MD5 hashing algorithm. However, the example embodiments described herein are not limited to such hash function. Any of a variety of hashing algorithms can be used; however, the hashing algorithm used should be the same as was used to generate the signature in 220 of FIG. 2.

The result of the one-way hashing function is a digital signature 535 of the application or program requesting a running state. An MD5 hashing of the sorted and concatenated import table elements 515 results in a 16-byte hash.

Generating verification signature 535 is quick and reliable due to the utilization of at least the unique function names from the import table. As discussed above regarding the unique and static nature of the function names from an import table, hashing the sorted and concatenated function names results in a low rate of collisions, i.e., the chance of identical signatures for multiple executables is very small.

According to an example embodiment of a restricted-use server device, the API compares the hash, or verification signature 535, of the application or program requesting a running state to the list of signatures 555 of restricted applications or programs that has already been coded, or "baked," into the operating system. A negative result, with no matches between verification signature 535 and any of the signatures coded into the operating system, results in the application or program being loaded. A positive result, with verification signature 535 matching one of the signatures in the DLL of the operating system, results in the application or program being blocked from loading. Thus, usage of the server device is restricted in accordance with web server licenses for respective applications or programs.

The list of restricted applications or programs is formulated based on many considerations, including those of a business and/or financial nature. Thus, revisions to the list of signatures for restricted applications or programs can be continually updated as licenses are expired, revoked, purchased, renewed, etc. Accordingly, server devices 125 and 130 of FIG. 1 may periodically receive updated lists of restricted applications or programs in the forms of upgraded operating systems, service packs, etc.

The embodiments described above may be modified to reference not only restricted applications or programs but also authorized applications or programs. Such decisions may be made in accordance with evaluations of available resources and overhead. Regardless, such modifications do not in any way limit the scope of the embodiments described herein.

Further, the example embodiments described above are directed to blade web servers, although one of ordinary skill in the art should be able to appropriately modify such embodiment, as appropriate, for implementation of restricted-use application servers as well. Further, the embodiments may be modified, for example, to be implemented by both web servers and applications servers to prohibit the loading of applications suspected of containing bugs or viruses that may damage individual computers or even an entire network. Further, the embodiments may be modified to be implemented by a client operating system, for example to prohibit the loading of executables known to contain faulty or malicious code. The Microsoft® Windows® XP operating system is a non-limiting example of such an operating system. Further still, it may be desired to use such verification process to check for allowable, or eligible, applications or programs. For example, for a business kiosk intending to run only particular applications or programs server processing may be expedited if a corresponding server device checks for only authorized applications or programs.

Figure 6:
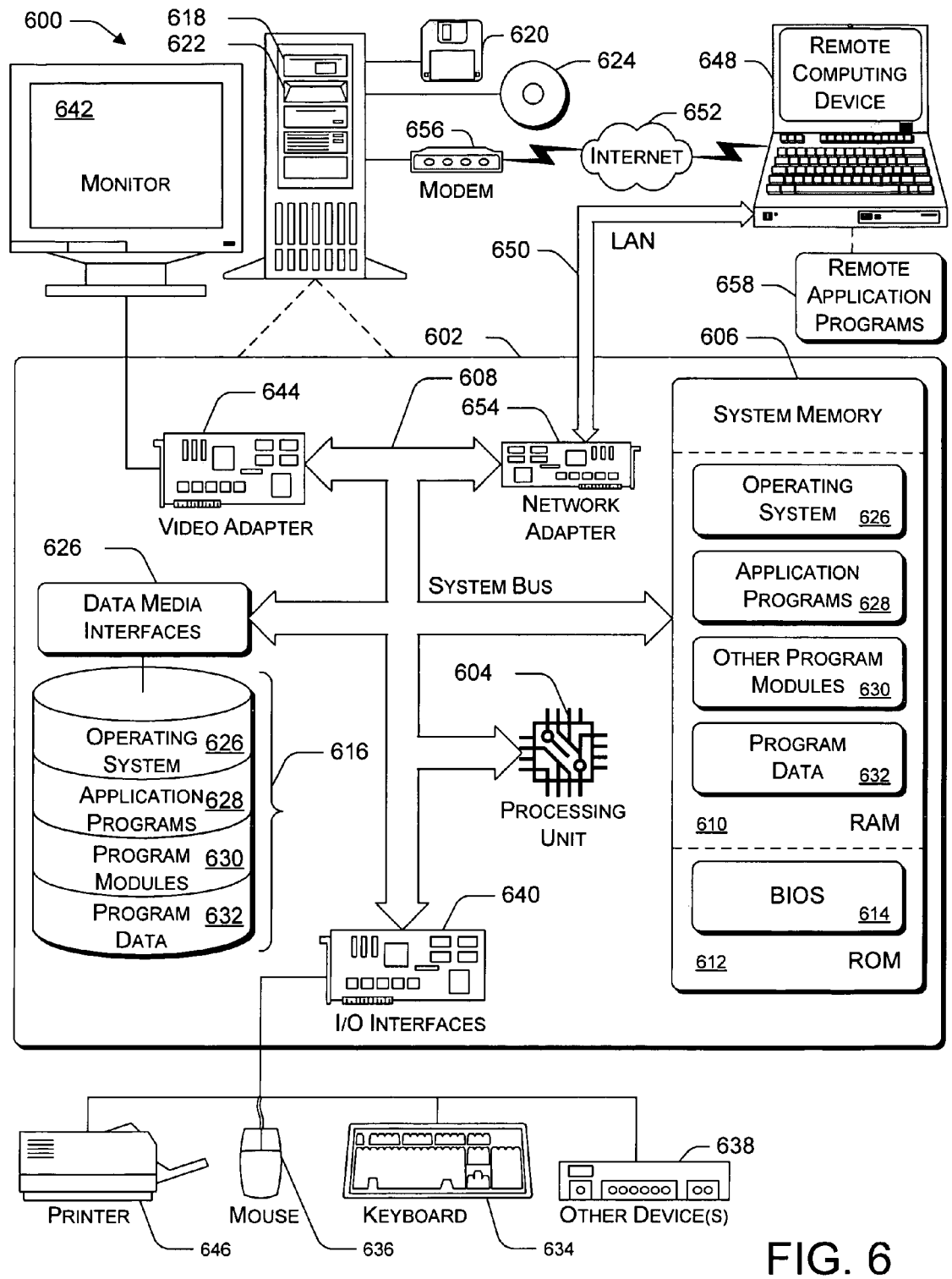
FIG. 6 illustrates a general computer environment which can be used to implement the techniques described herein.

FIG. 6 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. Computer 602 can be, for example, client device 105, 110, 115, or 120 or server device 125 or 130 of FIG. 1. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 602 may include a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610; and/or non-volatile memory, such as read only memory (ROM) 612 or flash RAM. A basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a PC, portable computer, a server, a router, a network computer, a peer device or other common network node, and the like. The remote computing device 648 is illustrated as a portable computer that can include many or all of the elements and features described herein relative to computer 602. Alternatively, computer 602 can operate in a non-networked environment as well.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are examples and that other means of establishing at least one communication link between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete blocks, although it is recognized that such programs and components reside at various times in different storage components of the computing device 602, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

The invention claimed is:

1. A method for managing access to resources, comprising:
   generating a list of resource signatures, each of the resource signatures being generated based at least on a plurality of function names included in an import table of a corresponding resource;
   accessing the list of resource signatures, each of the resource signatures configured with an accessibility status, wherein the accessibility status includes one of loadable and restricted;
   generating a verification signature for a requested resource, wherein generating a verification signature includes:
      retrieving a plurality of names from the import table, wherein the plurality of names include function names;
      sorting the retrieved names;
      concatenating the sorted names; and
      executing a cryptographic manipulation of the concatenated names;
   comparing the verification signature for the requested resource to the list of resource signatures;
   executing the requested resource if the resource signature matches the verification signature and the accessibility status is loadable; and
   preventing the requested resource from execution if the resource signature matches the verification signature and the accessibility status is restricted.

2. A method according to claim 1, wherein the resources include applications or programs.

3. A method according to claim 1, wherein each of the resource signature is generated based further on one or more dynamic link library (DLL) names, and wherein the verification signature is generated based further on one or more dynamic link library (DLL) names.

4. A method according to claim 1, wherein executing a cryptographic manipulation includes executing a hash function.

5. A method according to claim 1, wherein the plurality of names further include DLL names.

6. A method according to claim 1, further comprising preventing the requested resource from execution if the resource signature does not match the verification signature and the accessibility status is restricted.

7. A method according to claim 1, further comprising preventing the requested resource from execution if the resource signature does not match the verification signature and the accessibility status is loadable.

8. A method according to claim 1, wherein a same procedure is followed to generate each of the resource signatures and to generate a verification signature.

9. A method according to claim 1, further comprising coding the generated list of resource signatures into a dynamic link library (DLL) of an operating system kernel.

10. A method according to claim 1, wherein executing a cryptographic manipulation includes executing a hash function.

11. A method of restricting particular applications, comprising:
   receiving a list of application fingerprints corresponding respectively to restricted applications;
   receiving a request to execute an application;
   generating a confirmation fingerprint for the requested application, wherein generating the fingerprint includes:
      retrieving a plurality of names from an import table, wherein the plurality of names include function names;
      sorting the retrieved names;
      concatenating the sorted names in a predetermined manner; and
      hashing the concatenated names;
   comparing the confirmation fingerprint to the list of application fingerprints; and
   restricting the requested application if the confirmation fingerprint matches one of the application fingerprints respectively corresponding to restricted applications.

12. A method according to claim 11, wherein the confirmation fingerprint is further generated from DLL names included in the import table of the requested application, and wherein retrieving a plurality of names further includes retrieving DLL names.

13. A method according to claim 11, wherein hashing the organized names include performing one of a Message Digest (MD) 5 hash and a Secure Hash Algorithm (SHA) 1.

14. A method according to claim 11, wherein the restricted applications are not licensed.

15. An apparatus, comprising:
   an interface to receive a request for a running state of an application;
   an application identifier to generate an application digital signature for the application, the application identifier is to:
      retrieve a plurality of names from an import table from the application, wherein the plurality of names include function names;
      sort the retrieved names;
      concatenate the sorted names; and
      execute a cryptographic manipulation of the concatenated names;
   an application manager to match the application digital signature against a list of stored digital signatures indicating whether corresponding applications are eligible or ineligible for a running state; and
   an enabler to enable the running state for the application if the application digital signature is not matched to a stored digital signature indicating that the application is ineligible.

16. An apparatus according to claim 15, wherein the application identifier is to execute a cryptographic manipulation by execute a hash function on the concatenated names.

17. An apparatus according to claim 16, wherein the hash function includes an MD5 hashing algorithm.

18. A computer-accessible storage medium having an application programming interface (API), the API having one or more instructions to cause one or more processors to:

receive a request to run a program;
generate a digital signature by causing the one or more processors to:
  retrieve a plurality of names from an import table of the program, wherein the plurality of names include function names;
  sort the retrieved names;
  concatenate the sorted names; and
  execute a cryptographic manipulation of the concatenated names;
compare the generated digital signature against a compilation of digital signatures corresponding to restricted programs; and
enable only those programs for which the signature does not match with any of the compiled signatures.

19. A computer-accessible storage medium according to claim 18, wherein the one or more instructions to cause the one or more processors to execute a cryptographic manipulation includes causing the one or more processors to execute a hash function on the concatenated names.

20. A computer-accessible storage medium according to claim 18, wherein the API is included in an operating system.

21. A computer-accessible storage medium according to claim 18, wherein the operating system runs on a web server.

22. A computer-accessible storage medium according to claim 18, wherein the operating system runs on an application server.

23. A license enforcement method, comprising:
generating a digital signature for each of a plurality of applications based at least on a plurality of function names included in an import table of each application;
classifying each of the digital signatures in accordance with a licensing status for the corresponding applications;
coding an operating system to:
  include the classified digital signatures;
  generate a digital signature for a requested application by perform steps that include:
    retrieve a plurality of names from an import table of the program, wherein the plurality of names include function names;
    sort the retrieved names;
    concatenate the sorted names; and
    execute a cryptographic manipulation of the concatenated names;
  compare the digital signature for the requested application to the classified digital signatures; and
  run the requested application when the digital signature for the requested application does not map to digital signature classified as not being licensed.

24. A license enforcement method according to claim 23, further comprising downloading an updated list of the classified digital signatures to the operating system.

25. A method according to claim 23, wherein generating a digital signature for a requested application further includes generating the request digital signature based on a plurality of function names and one or more dynamic link library (DLL) names included in an import table of the requested application.

* * * * *